US005701412A

United States Patent [19]
Takeda et al.

[11] Patent Number: 5,701,412
[45] Date of Patent: Dec. 23, 1997

[54] TELECOMMUNICATIONS SERVICE CONTROL METHOD IN INTELLIGENT NETWORK

[75] Inventors: Yukiko Takeda, Tokorozawa; Shiro Tanabe, Hidaka; Kazuko Wakayama, Yokohama, all of Japan

[73] Assignee: Hitachi, Ltd., Tokyo, Japan

[21] Appl. No.: 355,509

[22] Filed: Dec. 14, 1994

[30] Foreign Application Priority Data

Dec. 17, 1993 [JP] Japan ................................ 5-317726

[51] Int. Cl.$^6$ ................................................ H01J 13/00
[52] U.S. Cl. ........................... 395/200.01; 395/200.15; 379/201; 379/230
[58] Field of Search .................... 395/200.01, 200.15; 379/201, 211, 212, 230, 330

[56] References Cited

U.S. PATENT DOCUMENTS

| | | | |
|---|---|---|---|
| 5,461,669 | 10/1995 | Vilain | 379/350 |
| 5,479,495 | 12/1995 | Blumhardt | 379/207 |
| 5,526,415 | 6/1996 | Wakamoto | 379/230 |

OTHER PUBLICATIONS

CCITT Study Group XI Working Document X1/4, Mar. 1992, pp. 11–24.

*Primary Examiner*—Alyssa H. Bowler
*Assistant Examiner*—John Harrity
*Attorney, Agent, or Firm*—Antonelli, Terry, Stout & Kraus, LLP.

[57] ABSTRACT

A trigger is armed to a predetermined detection point (DP) of a basic call state model controlled for each call by a switching system so that a service control point (SCP) can be unconditionally activated. The SCP stores service control information for each time band in such a manner as to correspond to each user. When a first control signal is received from the switching system, the DP which is determined by the service control information is notified to the switching system and the switching system arms the trigger to this DP. When the state of the call shifts to a specific DP to which the trigger is armed because a called party is busy or does not answer, for example, the switching system sends a second control signal to the SCP, and the SCP notifies a terminating terminal equipment determined by the service control information in response to the second control signal.

24 Claims, 14 Drawing Sheets

| TIME | UNCONDITIONAL FORWARDING | BUSY FORWARDING | NO ANSWER FORWARDING |
|---|---|---|---|
| 10:00-12:00 | | 0123-45-6767 | |
| 12:00-13:00 | | MAIL BOX | MAIL BOX |
| 13:00-17:00 | | | 0123-45-6767 |
| 17:00-10:00 | TALKIE | | |

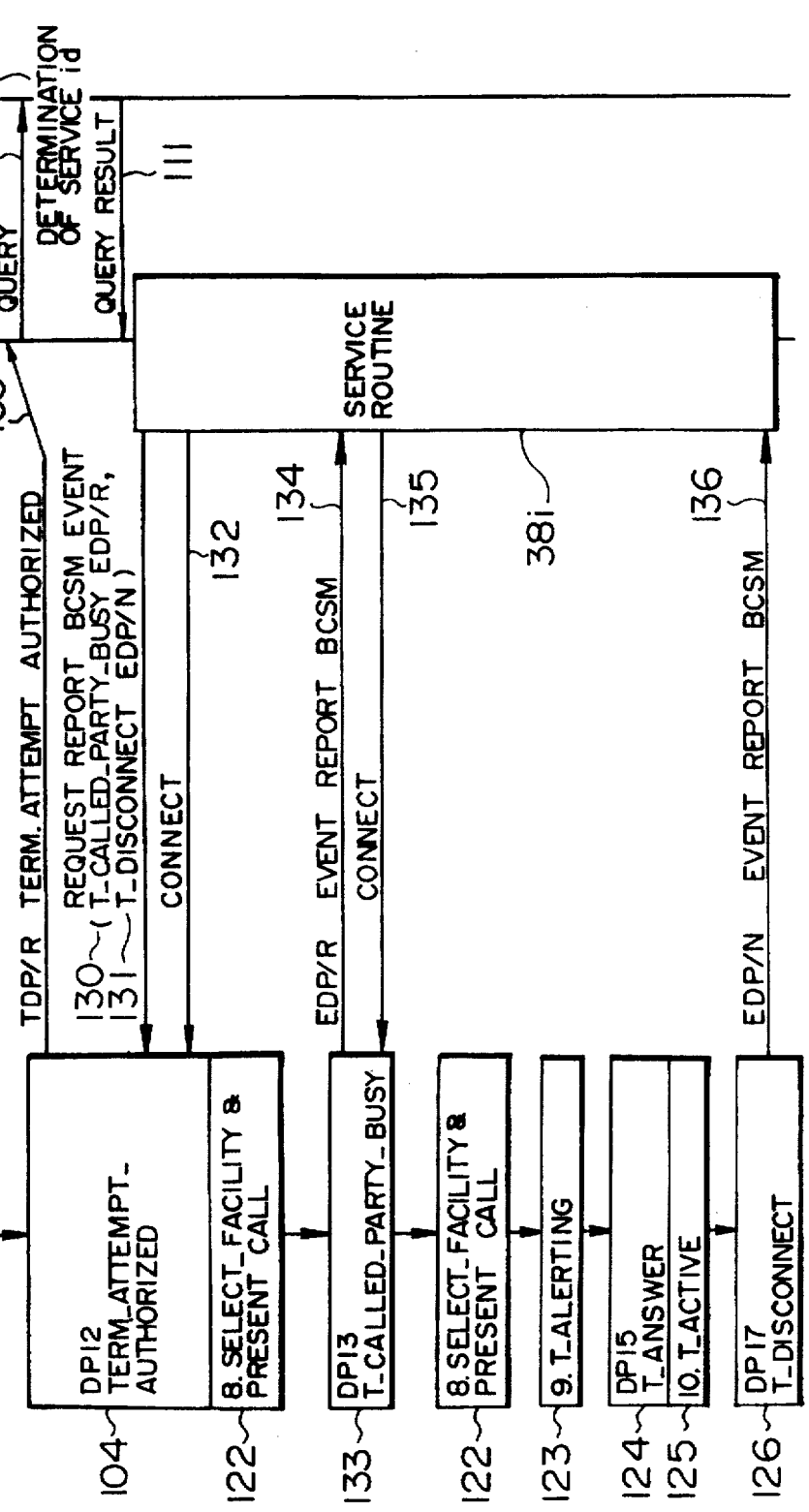

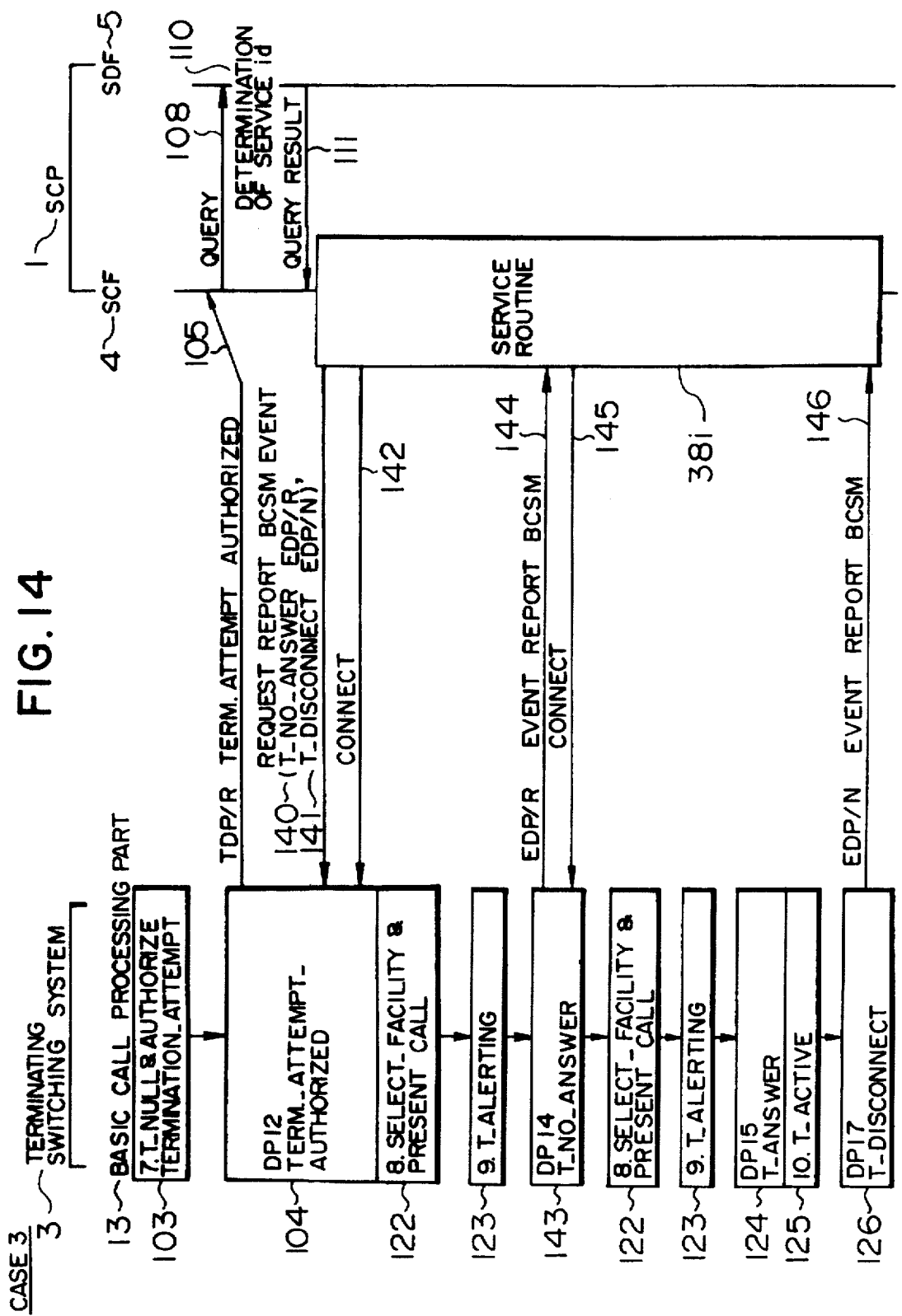

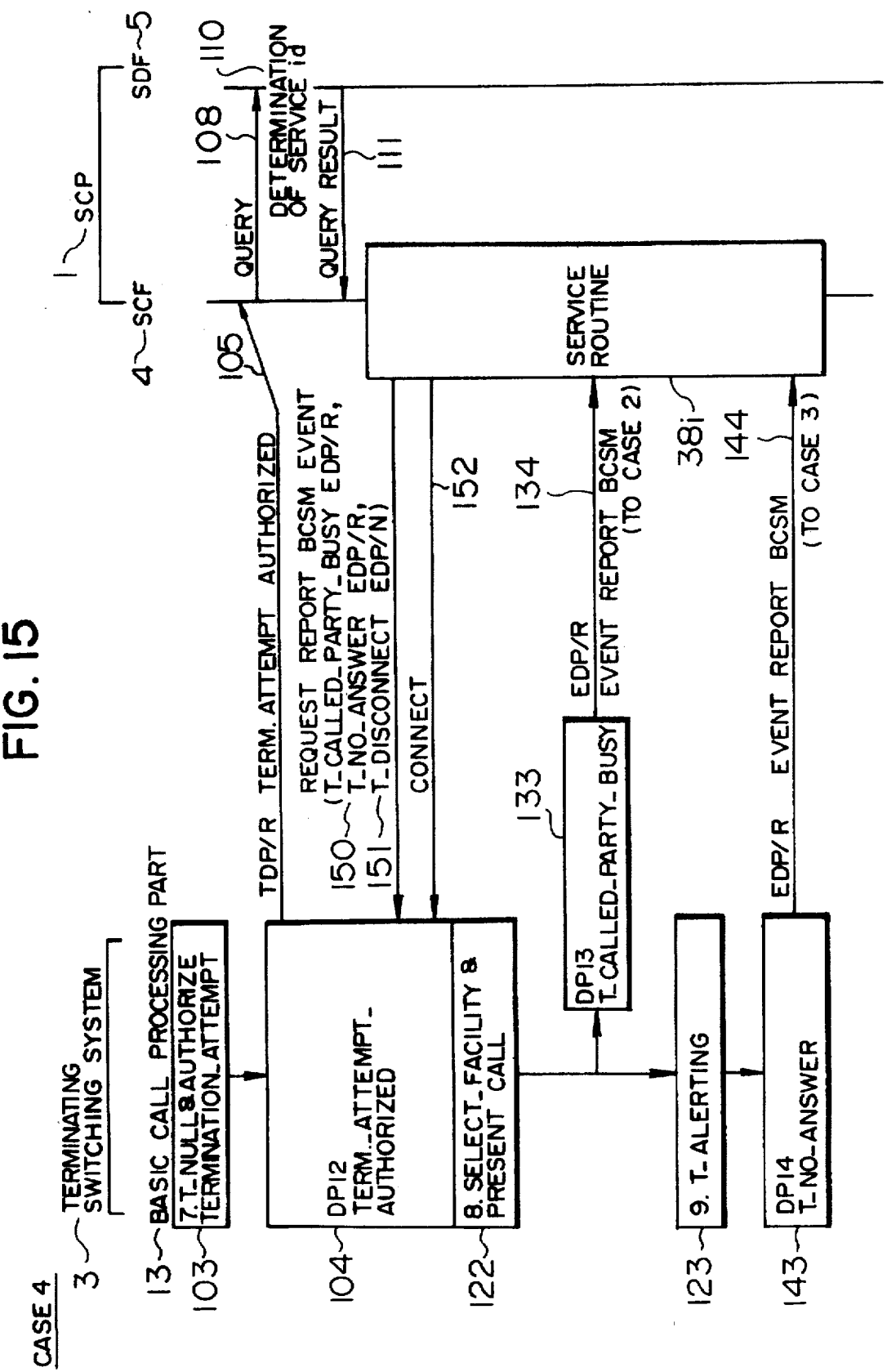

TELECOMMUNICATIONS SERVICE CONTROL METHOD IN INTELLIGENT NETWORK

BACKGROUND OF THE INVENTION

1. Field of the Invention

This invention relates to a service control system in a switching node or in an intelligent network.

2. Description of the Related Art

Intelligent Network Capability Set 1 of an intelligent network has been standardized by the former CCITT (International Telegraph and Telephone Consultative Committee; now ITU-T: International Telecommunication Union-Telecommunication Standardization Sector)in order to quicken and customize services, to facilitate service operations and to improve flexibility of functional arrangements (CCITT Recommendation Q1200–1290 series).

The Intelligent Network Capability Set 1 stipulates the operations of a basic call processing by a basic call state model (BCSM).

As described in CCITT STUDY GROUP XI WORKING DOCUMENT X1/4 (1992.3.10–17), the BCSM is dividedly defined for an originating-basic call state model (O_BCSM) and a terminating-basic call state model (T_BCSM), and a detection point DP of the BCSM provides an opening from a switching system to a service control point SCP. The intelligent network service is activated by a trigger which is armed to the DP of the BCSM.

Four kinds of triggers, that is, TDP (Trigger Detection Point)/R (Request), TDP/N (Notification), EDP (Event Detection Point)/R and EDP/N, are stipulated.

The intelligent network services are primarily those services which do not set a schedule and the time, as described in the CCTII Recommendation Q. 1219. When a service shown in FIG. 9 of the accompanying drawings is offered, for example, the trigger TDP/R is armed to DP 12 (Term._Attempt_Authorized) in the case of unconditional call forwarding, the trigger TDP/R is armed to DP 13 (T_Called_Party_Busy) in the case of busy forwarding and the trigger TDP/R is armed to DP 14 (T_No_Answer) in the case of no answer forwarding.

Arming/disarming processing of the TDP described above is repeated whenever the service content changes.

In the intelligent network, however, the service content must be essentially switched in accordance with a day of the week or in the time unit in order to offer services capable of flexibly coping with diversified requirements of users.

Nonetheless, it has not been possible in the past to designate by operator's single operation those forwarding services which differ depending on a week of the day or the time zone, as shown in FIG. 9.

To designate the services which are different depending on a day of the week or the time zone as requested by the users, it has been necessary conventionally to input individually the service control information in each execution time zone from the SMP and to arm the trigger TDP to the corresponding DP during the shift of the basic call state. Accordingly, management of user data becomes complicated in both SMP and SCP and processing load to the SMP and the SCP becomes great.

The conventional system involves another problem that traffic for setting the TDP from a plurality of users concentrates in a switch time zone of the service content. Because switching system software access becomes necessary in each switching system so as to arm the trigger TDP/R to the BCSM, the call control operation as the original function of the switching system is impeded.

This tendency becomes all the more remarkable as the number of users requiring individual services increases and the users' requirements get more diversified.

SUMMARY OF THE INVENTION

It is an object of the present invention to provide a telecommunications network capable of flexibly coping with individual service requirements.

It is another object of the present invention to provide a service control system capable of flexibly coping with individual service requirements of users in an intelligent network.

To accomplish the objects described above, the present invention provides a telecommunications service control method in a telecommunications network comprising at least one switching system and a service control apparatus connected to the switching system and equipped with a memory device for storing service control information for each user, the method comprising a step of creating a call control sequence for controlling a state of a call inside the switching system when the service control apparatus accepts the call relating to a special telecommunications service to be provided, whereby a first trigger for requesting transmission of a control signal to the service control apparatus is armed to a predetermined detection point (hereinafter referred to as "DP") in the call control sequence; a step of controlling the call in accordance with the call control sequence by the switching system and sending a first control signal including a dial number from the switching system to the service control apparatus when the state of the call shifts to the predetermined DP in the call control sequence; a step of causing the service control apparatus to execute a service program so arranged in advance as to correspond to the dial number, to read out service control information corresponding to the dial number from the memory device during the execution process of the service program, and to notify a DP to which a trigger is to be next armed in the call control sequence, to the switching system; and a step of causing the switching system to arm a second trigger to the DP designated by the service control apparatus during the call control sequence; wherein a second control signal is sent from the switching system to the service control apparatus when the state of the call shifts to the DP to which the second trigger in the call control sequence is armed, the service control apparatus designates the content of a special service determined by the service control information to the switching system in response to this second control signal, and the switching system executes the special service designated by the service control apparatus in connection with this call in response to the second control signal.

The present invention provides also a telecommunications network comprising at least one switching system connected to a plurality of user terminal equipments and a service control apparatus for providing personal communication services, connected to the switching system, wherein said switching system includes means for executing call control while shifting a state in accordance with a call state model for each call; and means for sending a control signal including a dial number of the call to the service control apparatus when the state of the call shifts to any of detection points (hereinafter referred to as "DPs") in the call state model and if, in this instance, a trigger representing a transmission request of the control signal is armed to the DP;

and wherein the service control apparatus includes first memory means for storing the relation of correspondence between the dial number and a service id; second memory means for storing a plurality of records for service control which are so arranged as to correspond to the dial numbers, respectively; third memory means for storing a plurality of service routines each having an intrinsic service id, and having the functions of reading out an information record for service control specified by the dial number from the second memory means and designating at least one DP to which a trigger is to be armed in accordance with the content of the information record; and processor means for determining a service id corresponding to the dial number designated by the control signal by looking up the first memory means when the first control signal in one call is received from the switching system, executing the service routine corresponding to the service id read out from the third memory means and notifying control information representing at least one DP and a kind of trigger to be armed to the DP, to the switching system; and wherein the switching system consequently executes the service designated by the service control apparatus.

According to the construction of the present invention, when the switching system receives a call of a special dial number having service control information (the call of this kind will be hereinafter called the "intelligent network call; IN call") at the SCP, the SCP is activated at a specific DP in the call control sequence (for example, the basic call state model BCSM), so that the switching system can arm the trigger to other DPs or can effect call forwarding operation to a specific terminating terminal equipment having other dial number by the designation from the SCP.

Accordingly, if the user registers in advance the service content defined dividedly into a plurality of time zones shown in FIG. 9, for example, to the SCP, the SCP gains access to control information for a terminating service corresponding to an IN call when the IN call to user occurs, and a predetermined trigger EDP can be armed in the DP of the call control sequence of the switching system in accordance with the definition designated by the control information for the terminating service in accordance with a day of the week, the time zone, and so forth.

Accordingly, the control signal is created from the switching system to the SCP when the call shifts to a specific state such as when "called party is busy" or "called party does not answer", the SCP designates the service which corresponds to this state and which is designated by the user to the switching system, and the switching system executes the operation in accordance with this designation. In this way, the intelligent network service such as call forwarding control to designated terminal equipments, which differ depending on the time zones, can be executed.

The foregoing and other objects, advantages, manner of operation and novel features of the present invention will be understood more apparently from the following detailed description when read in conjunction with the accompanying drawings.

BRIEF DESCRIPTION OF THE DRAWINGS

FIG. 13 is a signal sequence diagram showing in detail service execution control (Case 2);

FIG. 14 is a signal sequence diagram showing is detail service execution control (Case 3); and FIG. 15 is a signal sequence diagram showing in detail service execution control (Case 4).

DESCRIPTION OF THE PREFERRED EMBODIMENTS

Figure 1:
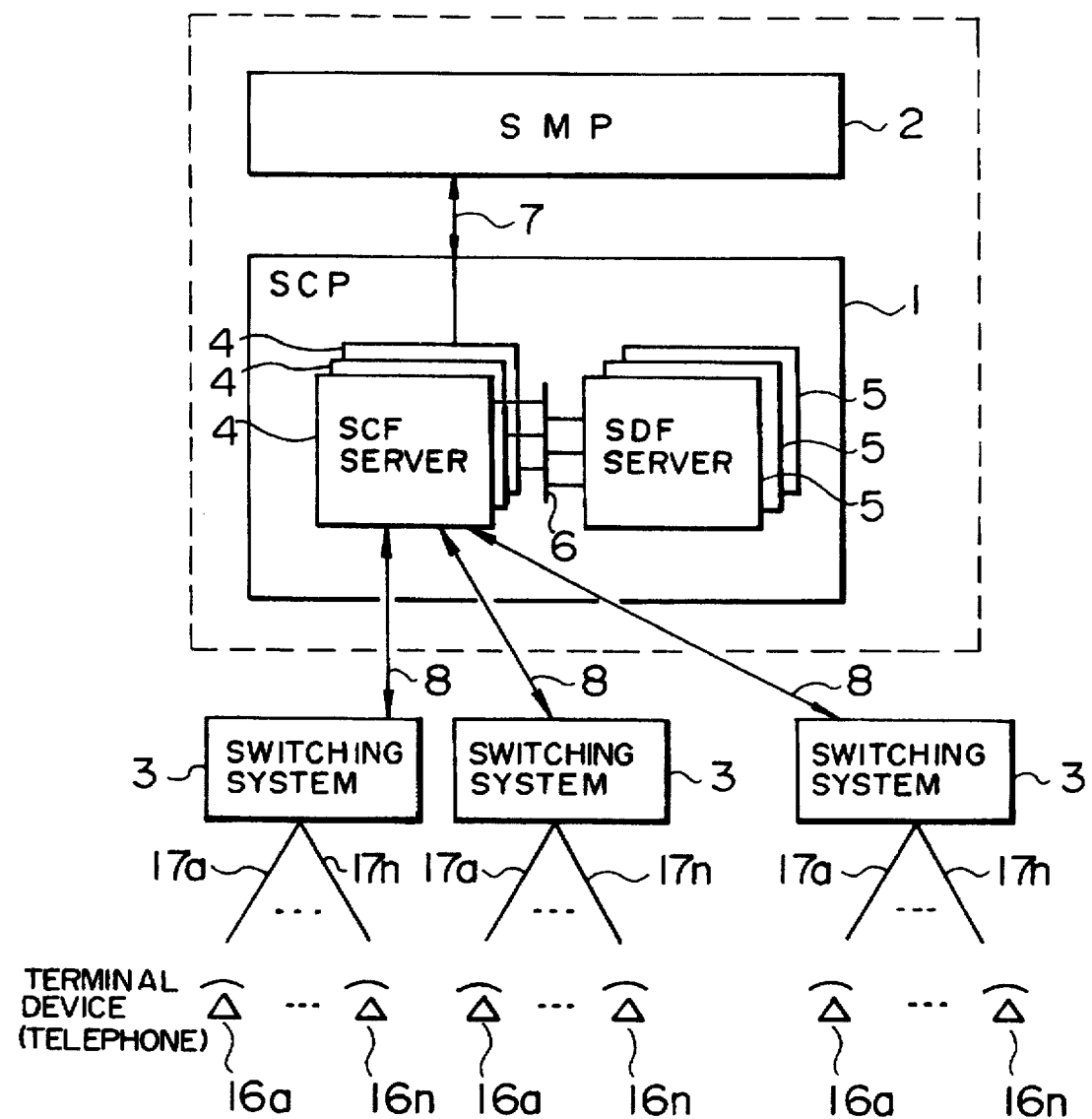
FIG. 1 is a diagram showing an example of the construction of an intelligent network.

FIG. 1 shows the construction of an intelligent network as an example of the network to which the present invention is applied.

The intelligent network (IN) comprises a service control apparatus (hereinafter referred to as the "service control point", SCP) 1, a service management apparatus (hereinafter referred to as the "service management point", SMP) 2 and a plurality of switching systems 3, as the basic constituent elements.

A plurality of subscriber terminals 16 (16a to 16n) are accommodated in each switching system through subscriber lines 17 (17a to 17n).

The SCP 1 executes those network-wide services which each switching system alone cannot deal with. For example, it executes specific switching processings for which routine on the basis of a numbering plan cannot be made in general translation of dial numbers such as in the case of so-called "toll-free number service" (freephone service) which allows a terminating user being charged for the cost of the call when an originating user dials the number designated in advance, or switching services for making access to terminating service data registered individually by a user such as in the case of so-called "call forwarding service".

The SMP 2 corresponds to a network management center, and executes service creation by a maintenance personnel, traffic management and support processing such as toll accounting. Registration of the control information for the terminating service corresponding to the request from the subscriber such as the "call forwarding service" described above is effected to a service data function (SDF) server 5 of the SCP 1 when the maintenance personnel executes an input operation to the SMP 2.

Each switching system 3 has the function of detecting a call which needs to gain access to the SCP 1 (hereinafter, this call will be referred to as the "IN call"), and general calls (basic calls) not requiring the SCP access are processed in the closed form inside each switching system.

Figure 2:
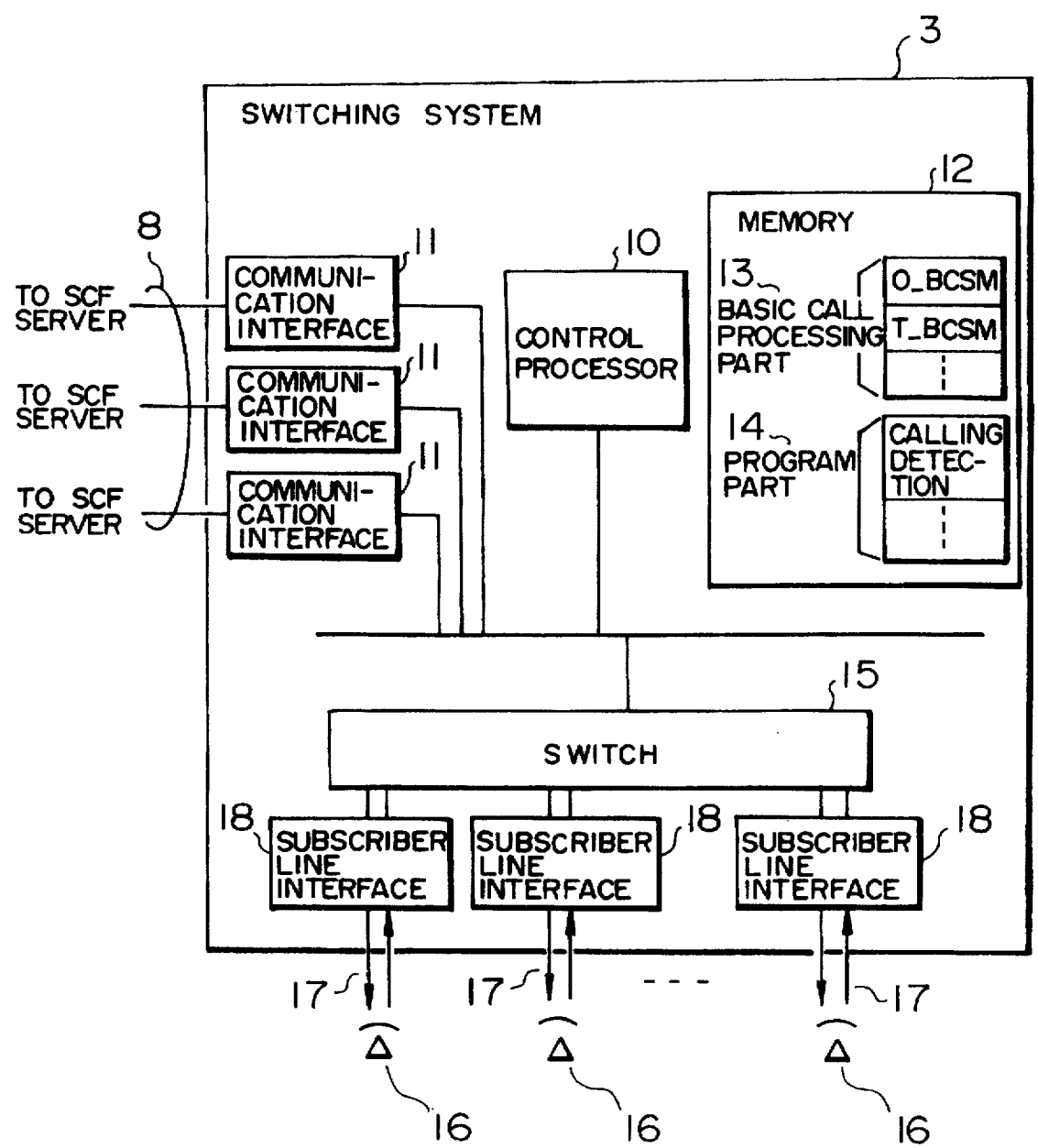
FIG. 2 is a diagram showing the construction of a switching system.

FIG. 2 shows the construction of the switching system 3.

The switching system 3 is comprised of a control processor 10 for executing communication of control signals with the SCP 1 and call controls, a plurality of communication interfaces 11 for terminating signal lines 8 connected between these interfaces and the SCP 1, respectively, a memory 12, a switch unit 15 and buses for connecting these members. The switch unit 15 accommodates a plurality of subscriber interfaces 18 for terminating subscriber lines 17 connected to subscriber terminating equipments 16, respectively.

The memory 12 is made up of a basic call processing routine 13 and an area 14 for storing other control programs. Besides the BCSM stipulated by the Intelligent Network Capability Set 1, the basic call routine 13 includes, for example, an IN call management table representing the relation between "the dial number corresponding to the IN call" and a "DP position at which a trigger is to be armed at the time of generation of call BCSM". The control program area 14 includes programs necessary for switching processing of call control and communication information such as "calling detection".

The message stipulated by the CCITT (International Telegraph and Telephone Consultative Committee) recommendation Q. 1214, 1218 shown in FIG. 7, for example, is used for the communication between the control processor 10 and an SCF server 4, which is contained in the SCP 1 and will be described later, through the communication interface 11.

The SCP 1 is functionally made up of one or a plurality of SCF (service control function) servers 4 and one or a plurality of SDF (service data function) servers 5. However, the functions of the SDF servers 5 may be combined with those of the SCP servers 4 or the function of the SDF servers 5 may be put on other apparatus such as Service Data Point (SDP) apparatus.

Figure 3:
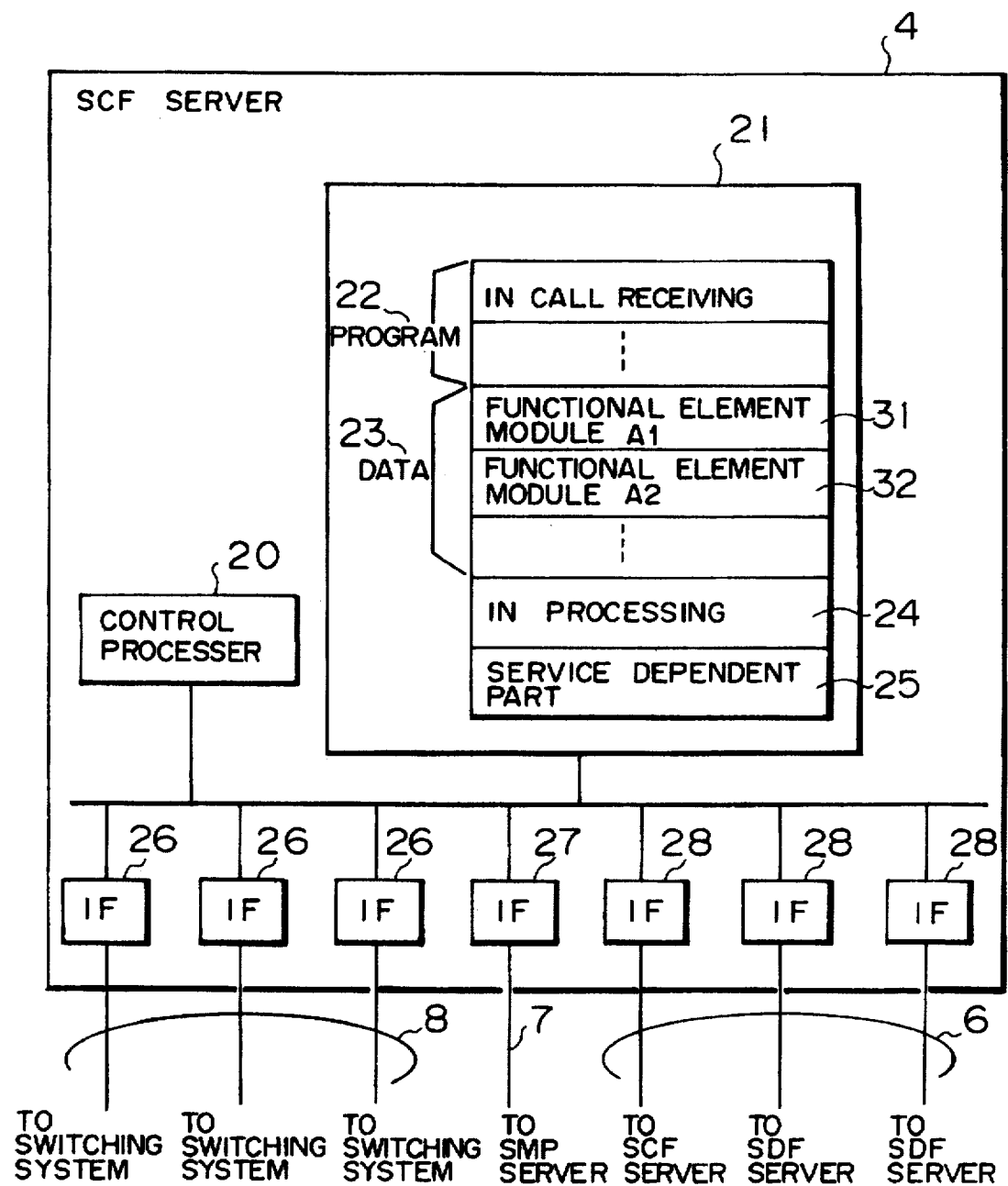
FIG. 3 is a diagram showing the construction of an SCF server.

FIG. 3 shows the construction of the SCF server 4.

The SCF server 4 executes service processing for the IN call, and comprises a control processor 20, a memory 21 and a plurality of interfaces (26, 27, 28) for establishing communication with the switching system, the SMP and the SDF servers or with other SCF servers, respectively.

The memory 21 is made up of a program area 22 for storing various programs necessary for executing the services such as the IN call reception program, etc., a data area 23 for storing functional element modules (31, 32) used for the execution of the services, an IN processing part 24 for providing the execution function of the IN processing and a service dependent part 25 for storing routines corresponding to the services id (service module group).

Figure 4:
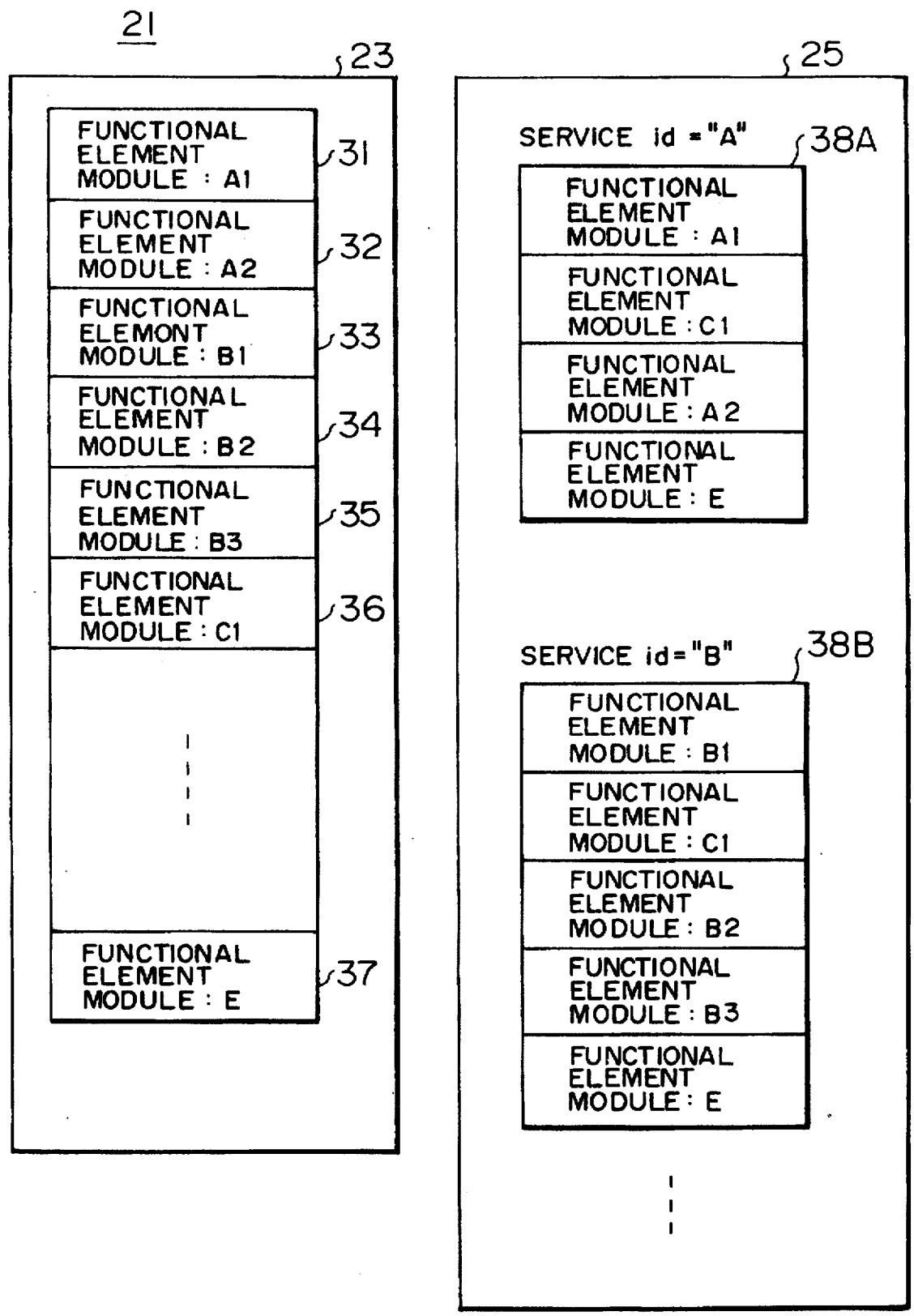
FIG. 4 is a diagram showing the construction of a program part of the SCF server.

As shown in FIG. 4, a plurality of routines 38 (38A, 38B, ...) so prepared as to correspond to the services id are stored in the service dependent part 25. In this example, each service routine is constituted into a module table representing the combination of the functional element modules 31 to 37 prepared in the data area 23. For example, the service routine (module table) 38A defines the combination of a plurality of functional element modules necessary for executing the "call forwarding service" while the service routine 38B defines the combination of a plurality of functional element modules necessary for executing "toll-free" number (Freephone).

Figure 5:
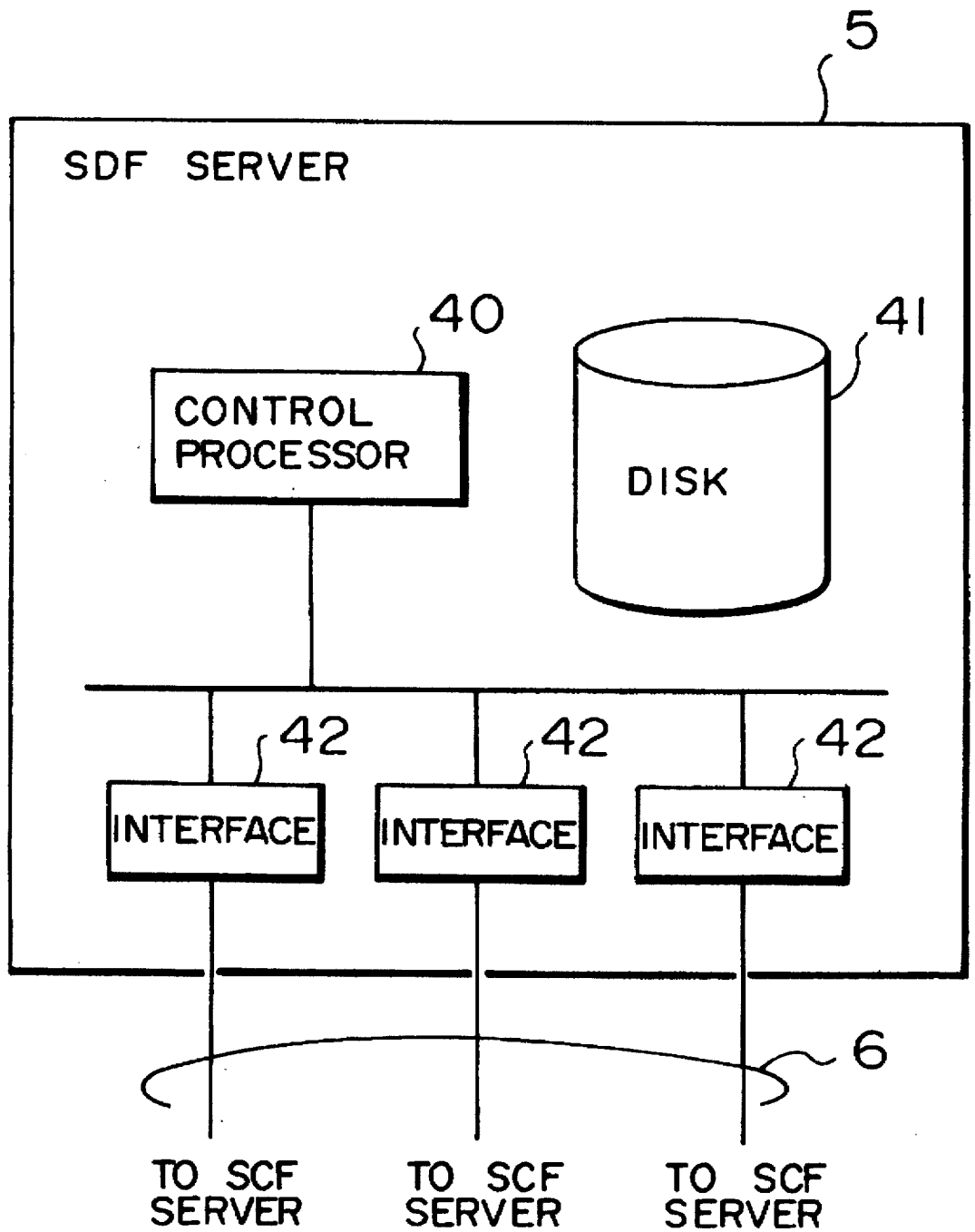
FIG. 5 is a diagram showing the construction of an SDF server.

FIG. 5 shows the construction of the SDF server 5.

The SDF server 5 is made up of a control processor 40, a disk 41 for storing service control information for each user (dial number) such as special service code information for toll-free number (Freephone) and control information for the call forwarding service, and an interface part 42 with the SCF server. Besides the service control information described above, the disk 41 stores a conversion table for acquiring a service id from the dial number, for example. The message stipulated by the CCITT recommendation Q. 1214, 1218 is used for the communication between the SDF server 5 and the SCF server 4.

Though the SDF server 5 is shown connected to the SCF server through the interface 42 in this embodiment, the SDF server may be connected to the SMP 2 through the interface 42 so that the content of the disk 41 can be directly updated by the data input operation from the SMP.

Figure 6:
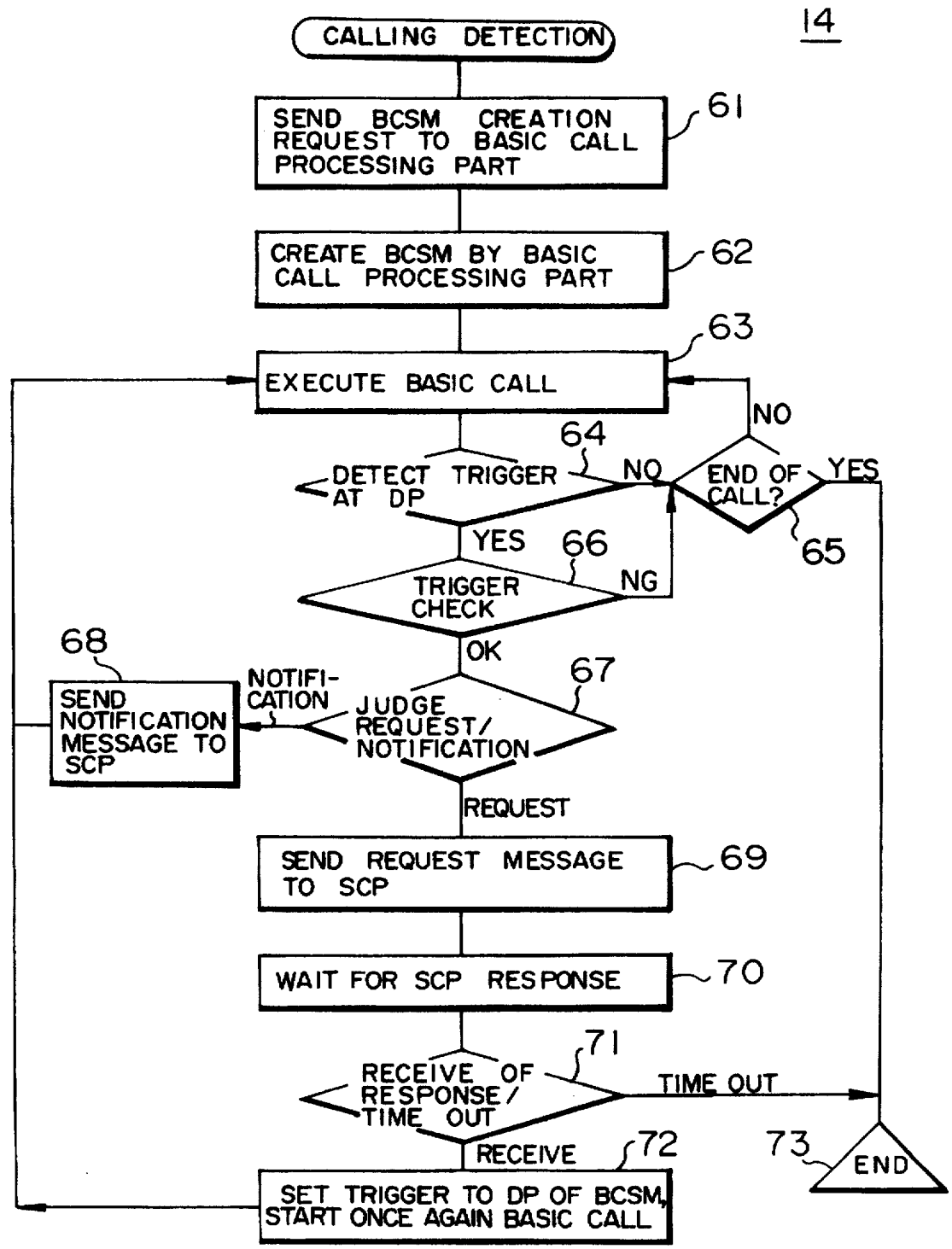
FIG. 6 is a flowchart showing the processing content executed in the switching system.

FIG. 6 shows the processing flow executed by the processor 10 of the switching system 3.

When a call is detected, the BCSM creation request message is sent to the basic call processing part 13 (step 61), and the basic call processing part 13 creates a new BCSM (basic call state model) in such a manner as to correspond to the call (or the dial number) designated by the BCSM creation request (step 62). Thereafter, the basic call processing is executed in accordance with this BCSM (step 63).

Each BCSM is made up of a plurality of states (or steps) and some of them are defined as a DP (detection point) which can be armed the trigger.

When the detected call is the IN call requiring the access of the SCP 1, a BCSM the trigger of which is armed in advance to the DP at a specific position determined in accordance with the kind of the IN service is created, and when the state of the call shifts to the specific DP described above, the first control signal (message) can be sent to the SCP 1. When the detected call is the general call, a BCSM not at all containing the rigger for the SCP access is created.

When the state of the call shifts to the DP (detection point) of the BCSM due to the basic call processing described above, whether or not the trigger is armed to the DP is judged (step 64). When the trigger is detected, correctness of this trigger is checked (step 66). When the trigger is found as being correct, the kind (request type/notification type) of the trigger is judged (step 67).

When the trigger kind is of the R type (request type), the request message is sent to the SCP 1 (step 69) and when it is of the N type (notification type), the notification message is sent to the SCP 1 (step 68).

When the trigger kind is of the R type, the switching system waits for the response from the SCP 1 after sending the request message to the SCP (step 70).

When the response message from the SCP received by the switching system is the one that requires setting of the trigger, the switching system arms the trigger to the DP designated by this response message and then starts once again the basic call processing (step 72). When a timer reaches time-out before the switching system receives the response message from the SCP, it terminates the BCSM (step 73). When the trigger is of the N type, the switching system sends the message to the SCP and then continues the basic call processing.

Figure 7:
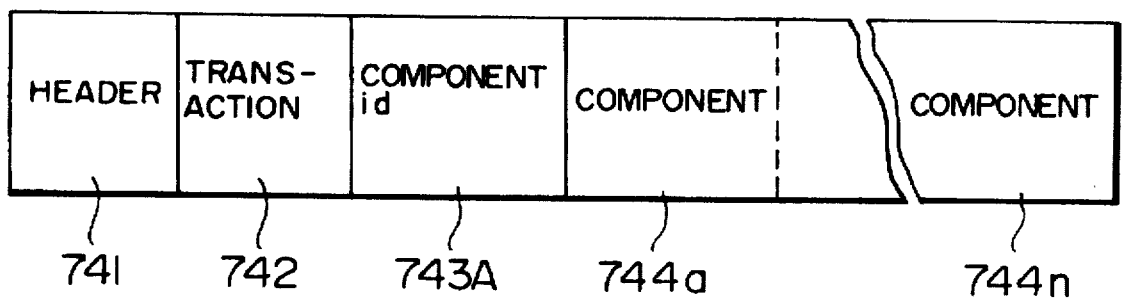
FIG. 7 is a diagram showing a signal format between the switching system and the SCP.

The message between the switching system and the SCP is exchanged by a signal format 74 shown in FIG. 7, for example.

Reference numeral 741 denotes a header part and reference numeral 742 does a transaction field representing an identifier of the call and distinction if the message is the first or final message in each call (or each BCSM) or other intermediate message and so on. Reference numeral 743 denotes a component field comprising a plurality of components 744a to 744n and a component identifier 743A representing the attributes of these components. Here, each component 744 corresponds to the content of one message, and when a plurality of components are set to the component field 743, the contents of a plurality of messages can be simultaneously sent by one message format.

Figure 8:
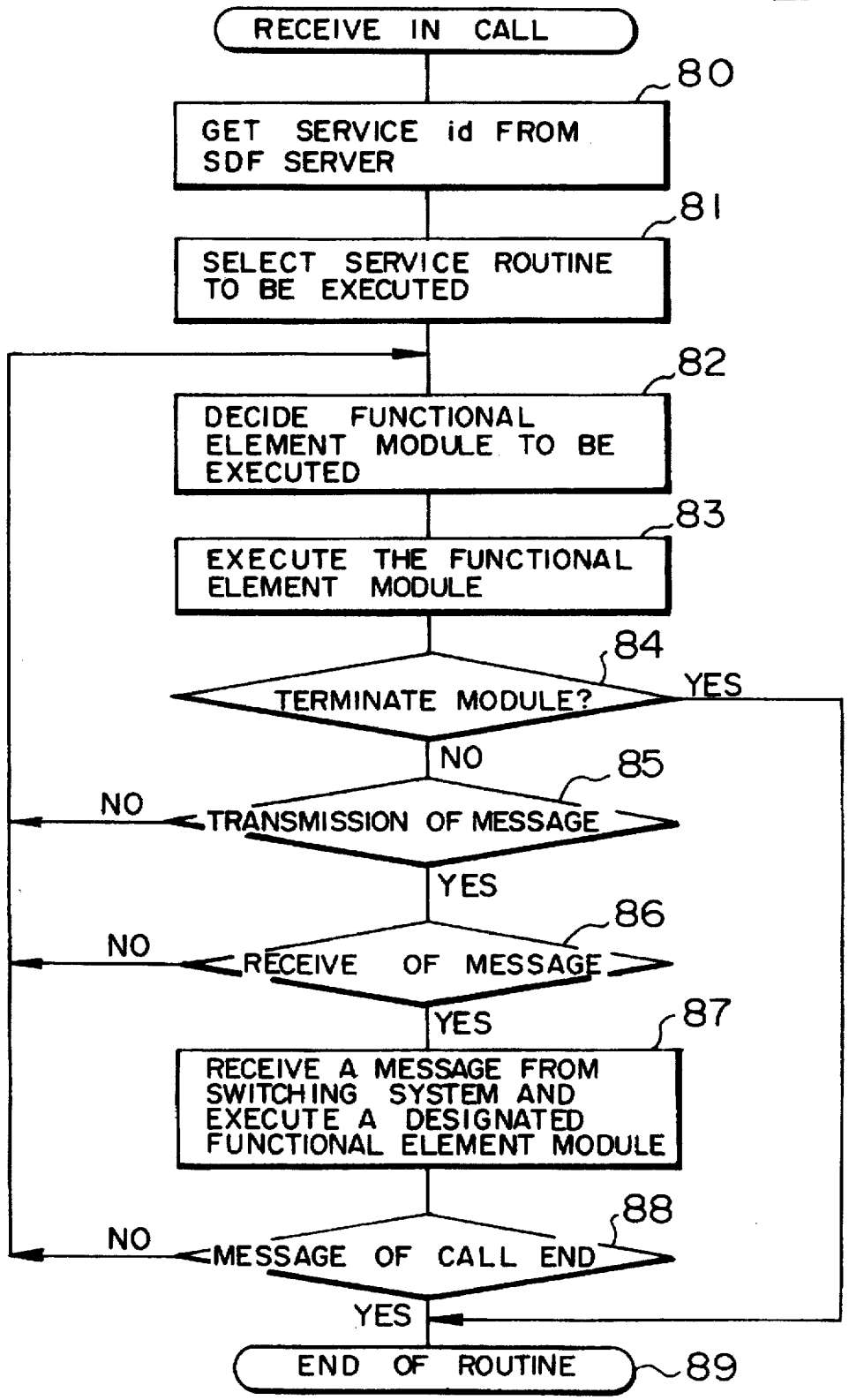
FIG. 8 is a flowchart showing the processing content executed by the SCP.

FIG. 8 shows the processing flow of the IN call reception program executed by the SCF server 4 of the SCP 1.

Receiving the request message or the response message from the switching system 3, the SCP 1 (SCF server 4) sends the message so received to the IN processor 24.

After receiving the first message in each IN call, the IN processor 24 sends it to the SDF server 5 in order to know the service id corresponding to the dial number contained in the message received (step 80).

The SDF server 5 looks up the conversion table stored in the disk 41, retrieves the service id corresponding to the dial number and sends them to the SCF server.

Receiving the reply of the service id from the SDF server 5, the SCF server 4 selects and decides the service routine 38$i$ corresponding to the service id as the routine to be executed, from among a plurality of service routines (module table) 38 stored in the service dependent part 25 of the memory 21 (step 81), sequentially specifies the functional element modules to be executed, in accordance with this service routine 38$i$ (step 82), reads out the corresponding functional element module from the data area 23 of the memory 21 and executes it (step 83).

When the executed functional element module is the module E for terminating the processing, the processing of the SCF server relating to this IN call is terminated (step 89). When it is not the module E, whether or not this functional element module is the one which requires message transmission to the switching system is judged (step 85). When it does not require the message transmission, the flow returns to the step 82 at which the functional element module to be next executed is specified.

When the executed functional element module is the one that requires the message transmission to the switching system, whether or not it is necessary to wait for the reception of the message from the switching system is judged (step 86). When it is not necessary to wait for the message reception, the flow returns to the step 82, at which the functional element module to be next executed is specified. When the reception of the message from the switching system needs be awaited, the message from the switching system is received and then the functional element module corresponding to the received message is executed (step 87).

When the reception message from the switching system is the call terminating message (step 88), the processing is completed, and when it is not, the flow returns to the step 82, at which the functional element module to be next executed is specified.

Figures 9, 10:
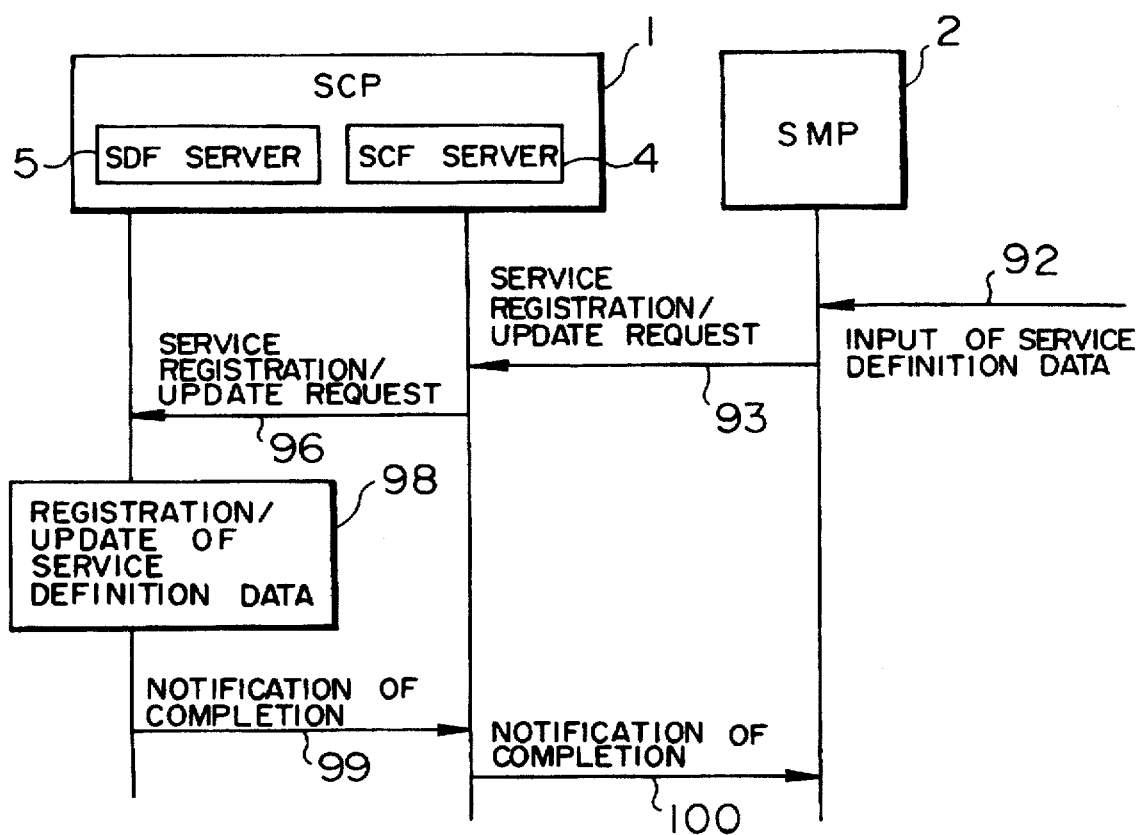
FIG. 9 is a diagram showing an example of user definition content in a call forwarding service.
FIG. 10 is a diagram for explaining data input at the time of registration/updating of the service content.

FIG. 10 shows an example of a signal sequence between the SMP 2 and the SCP 1 when the operator (managing person) of the SMP 2 registers the control information 90 for the call forwarding service having the content shown in FIG. 9, for example.

When the operator executes the data input operation (step 92) for registering the service control information for a certain user from the SMP 2 (or the change of the registered information), a service registration/updating request is sent from the SMP 2 to the SCF server 4 of the SCP 1 (step 93). Receiving the message described above, the SCF 4 sends it to the SDF server 5 (step 96).

The SDF server 5 registers the service control information (or updates the registered information) in the disk 41 in accordance with the message described above in such a manner as to correspond to the user identifier (telephone number) and the service id (step 98). When registration (or updating) of the service control information is completed, a message of processing termination notification is sent from the SDF server 5 to the SCF server 4 (step 99), and the SCF server 4 transits it to the SMP 2 (step 100).

In the signal sequence described above, the message of service registration/updating request may be directly given from the SMP 2 to the SDF server 5 without inclusion of the SCF server.

Next, the control operation when the IN call for the call forwarding service is created will be explained with reference to the signal sequences shown in FIGS. 11 to 15.

When the terminating switching system 3 receives the call set up message, it generates T_BCSM in accordance with the basic processing routine 13 inside the switching system and executes the basic call processing in accordance with this T_BCSM. When the call described above is the IN call, a trigger TDP/R is armed in advance by a DP 12 (Term._Attempt_Authorized) 104 shown in FIG. 11.

When the trigger TDP/R is detected at the DP 12 during the execution of T_BCSM in the basic call processing routine 13, a control message containing the dial number (Term._Attempt_Authorized) 105 to the SCP 1.

The control message 105 reaches the IN processing part 24 of the SCF server 4.

In order to know the service id corresponding to the dial number, the IN processing part 24 sends a query message (Query) 108 to the SDF server 5.

The SDF server 5 looks up the conversion table stored in the disk 41, decides the service kind (service id) corresponding to the dial number (step 110), and sends a response message (Query Result) 111 containing this service id to the SCF server 4.

The SCF server 4 looks up the service routine (module table) 38$i$ corresponding to the service id notified from the SCF server 4 and existing in the service dependent part 25 and starts the service by activating the first functional element module 112 that constitutes this service routine.

When, for example, the functional element module 112 for getting user's control information as the first constituent element of the service routine 38$i$ is executed, the control message (query) 113 containing the service id and the dial number is sent to the SDF server 5.

Receiving the message, the SDF server 5 gains access to the disk 41 on the basis of the service id and the dial number, and acquires the control information 90 for the terminating service of the user shown in FIG. 9, for example. A message (Query Result) 114 containing the information record of the time zone corresponding to the present time among the service control information described above is sent from the SDF server 5 to the SCF server 4.

In the SCF server 4, the control information described above is analyzed at the functional element module 115 for analysis of control information as the second constituent element of the service route 38$i$, and a module which coincides with the user's request is activated from among a plurality of functional element modules for the call forwarding service (e.g. 116 to 119) that are prepared in advance. If the user does not register the call service control information, a signal representing "no DP setting" is sent to the switching system.

The condition designated by the user and the functional element modules 116 to 119 to be activated have the following relation.

(Case 1): Execution of functional module 116

Figure 12:
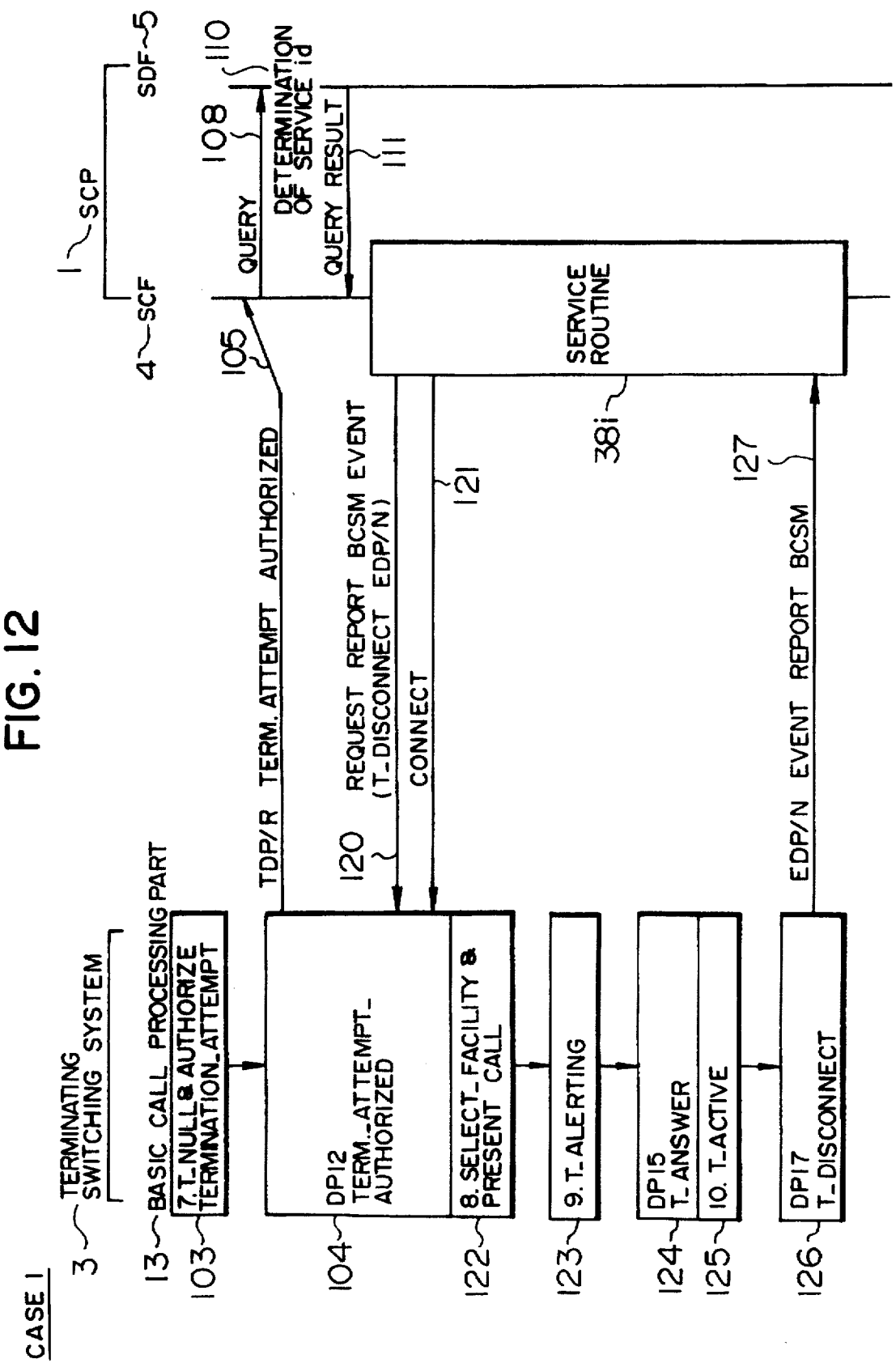
FIG. 12 is a signal sequence diagram showing in detail service execution control (Case 1)

The signal sequence which is executed when the user unconditionally transfers the call to the forwarding destination designated in advance is shown in FIG. 12.

When the IN processing part 24 of the SCF server 4 analyzes the control information of the user received from the SDF server and as a result, judges that it is the unconditional forwarding (for example, the case where the calls between 17:00 to 10:00 are forwarded to a recorded announcement machine or a "talkie" in the example shown in FIG. 9), it activates the functional element module 116.

When the functional element module 116 is executed, a message ("Request Report BCSM Event (T__Disconnect EDP/N") 120 for setting a trigger necessary for notifying call disconnection from the switching system 3 to the SCP 1 and a message requesting connection set-up ("Connect" 121) for designating the telephone number of the talkie as the terminating destination are transmitted from the SCP 1 to the switching system 3.

The switching system 3 sends these reception messages to the basic call processing part 13.

The basic call processing part 13 receives these messages by the DP 12 (Term.__Attempt__Authorized) 104, and arms the trigger EDP/N to a DP 17 (T__Disconnect) 126.

The switching system 3 executes the call processing operation in accordance with the BCSM and lets the call reach the recorded announcement machine. When the call disconnection message is received, the trigger EDP/N is detected at the DP 17 (T__Disconnect) 126. Therefore, a trigger detection message (Event Report BCSM) 127 is generated and is sent to the SCP 1.

Receiving the message 127, the SCP 1 executes a processing for terminating the service relating to the call by the IN processing part 24 of the SCF server 4.

(Case 2): Execution of functional module 117

FIG. 13 shows the signal sequence which is executed when the call is forwarded to the destination designated in advance by the user when the terminating terminal equipment is busy.

Figure 11:
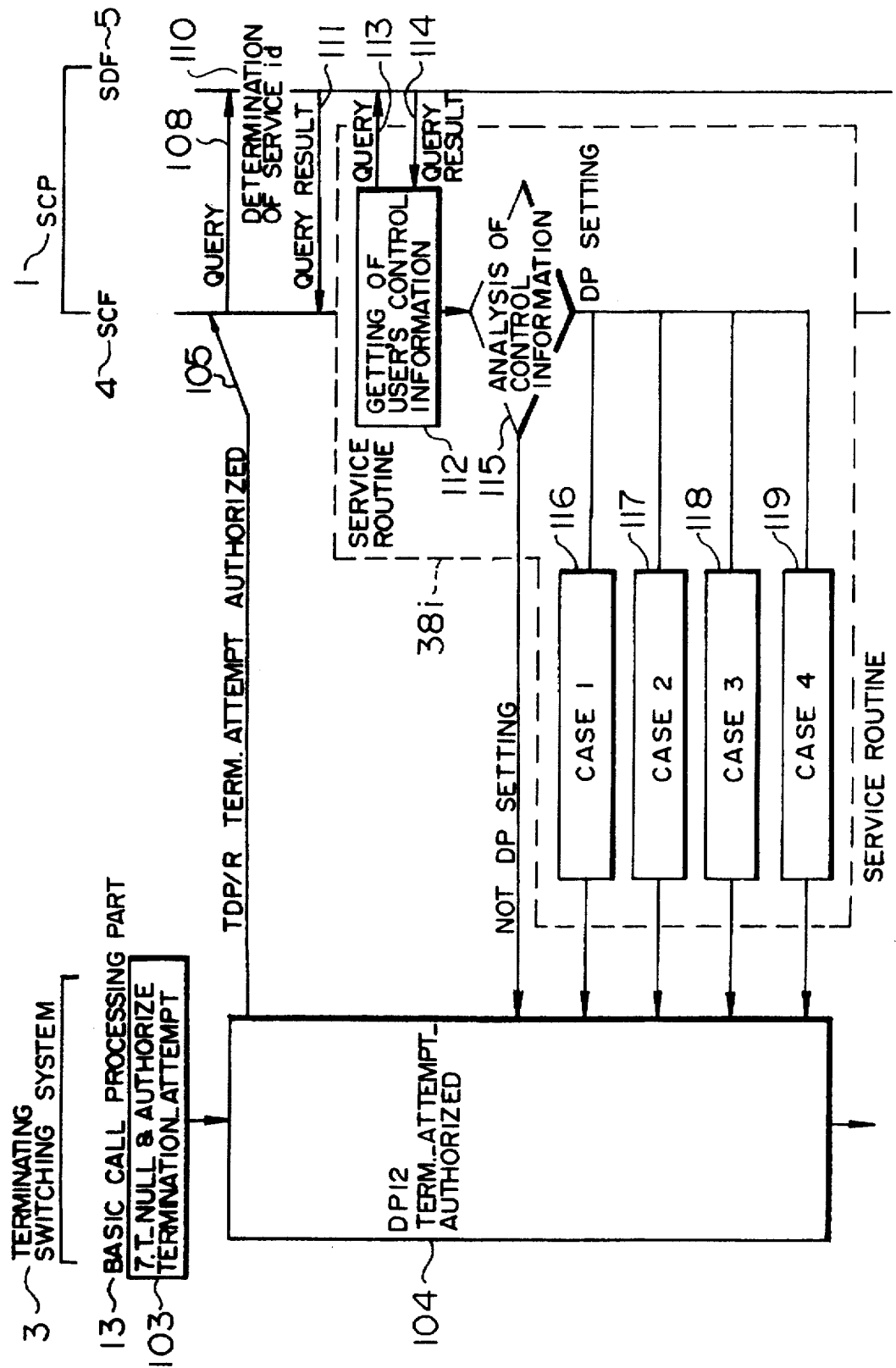
FIG. 11 is a signal sequence diagram for explaining service execution control according to the present invention.

When the IN processing part 24 of the SCF server 4 analyzes the control information of the user and judges it is necessary to forward the call to the forwarding terminal equipment designated by the user when the terminating terminal equipment is busy (for example,in the case where the calls from 10:00 to 12:00 are forwarded to the number 0123-45-6767 in the example shown in FIG. 9), it activates the functional element module 117 shown in FIG. 11.

Accordingly, the message [Request Report BCSM Event (T__Called__Party__Busy EDP/R)] 130 for arming the trigger EDP/R to a DP 13 (T__Called__Party__Busy) 133 of the basic call processing part of the switching system 3, the call disconnection notification message [Request Report BCSM Event (T__Disconnect EDP/N)] 131 and the message [Connect] 132 for requesting connection set-up which designates the telephone number of the termimating terminal equipment are transmitted from the SCP 1 to the switching system 3.

In the switching system 3, these messages are transferred to the basic call processing routine 13.

Receiving these message at the DP 12 (Term.__Attempt__ Authorized) 104, the basic call processing routine 13 arms the trigger EDP/R to the DP 13 (T__Called__Party__Busy) 133 and the trigger EDP/N to the DP 17 (T__Disconnect) 126, respectively.

When the basic call processing is executed by the switching system and if the terminating terminal equipment becomes busy, the switching system 3 detects the trigger EDP/R by the DP 13 (T__called__Party__Busy) 113 of the basic call processing routine. In consequence, the trigger detection message [Event Report BCSM] 134 is created and is transmitted to the SCP 1.

The SCP 1 sends the message described above to the IN processing part 24 of the SCF server 4.

Receiving the message, the IN processing part 24 sends the message for requesting connection set-up [Connect] 135 designating the telephone number of the terminating terminal equipment (0123-45-6767 in this example) to the switching system in order to forward the call to the terminating terminal equipment designated by the user.

In the switching system 3, the message 135 described above is sent to the basic call processing routine 13, so that the basic call processing is executed and the call is terminated at the terminating terminal equipment. When the switching system receives the call disconnection message, the trigger EDP/N is detected by the DP 17 (T__Disconnect) 126 and the trigger detection message (Event Report BCSM) 136 is sent to the SCP 1.

The SCP 1 receives the message 136 by the IN processing part of the SCF server 4 and executes the service terminating processing.

(Case 3): Execution of functional element module 118

FIG. 14 shows the signal sequence in the case where the terminating terminal equipment does not respond within a predetermined time and the call is forwarded to the forwarding terminal equipment designated in advance by the user.

The IN processing part 24 of the SCF server 4 analyzes the user control information. When the terminating terminal equipment does not respond within a predetermined time and when the IN processing part 24 judges it necessary to forward the call to the forwarding terminal equipment designated by the user (such as when the call from 13:00 to 17:00 is to be forwarded to "0123-45-6767" in the example shown in FIG. 9), the IN processing part 24 executes the functional element module 118.

Accordingly, the message [Request Report BCSM Event (T__Answer EDP/R)] 140 for arming the trigger EDP/R to a DP 14 (T__No__Answer) 143 of the basic call processing routine of the switching system, the call disconnection notification message [Request Report BCSM Event (T__Disconnect EDP/N] 141 and the message [Connect] 142 for requesting connection setup which designates the telephone number of the terminating terminal equipment, are sent from the SCP 1 to the switching system 3.

The switching system 3 sends these messages received to the basic call processing routine 13.

The basic call processing routine 13 receives these messages by the DP 12 (Term.__Attempt__Authorized) 104, arm the trigger EDP/N to the DP 14 (T__No__Answer) 143, and arm the trigger EDP/N to the DP 17 (T__Disconnect) 126.

The switching system 3 executes the basic call processing and when the terminating terminal equipment does not respond within a predetermined time, it detects the trigger EDP/R by the DP 14 (T__No__Answer) 143 of the basic call processing routine, creates the trigger detection message [Event Report BCSM] 144, and sends it to the SCP 1.

The SCP 1 sends this message 144 to the IN processing part 24 of the SCF server 4. Receiving this message, the IN processing part 24 sends the message for requesting connection setup designating the telephone number of the forwarding terminal equipment designated by the user [Connect] 145 to the switching system.

The switching system 3 sends this message to the basic call processing routine 13 and executes the basic call processing. In this way, the call reaches the forwarding terminal equipment and communication is effected. When the switching system receives the call disconnection message, the trigger EDP/N is detected by the DP 17 (T_disconnect) 126, and the trigger detection message [Event Report BCSM] 146 is created and is sent to the SCP 1. The SCP 1 receives this message by the IN processing part 24 of the SCF server 4 and executes the service terminating processing.

(Case 4): Execution of functional element module 119

FIG. 15 shows the signal sequence for forwarding the call to the forwarding terminal equipment designated in advance by the user when the terminating terminal equipment is busy or when no response is made within a predetermined time.

The IN processing part 24 of the SCF server 4 analyzes the user control information. As a result, when the IN processing part 24 judges it is necessary to forward the call to the forwarding terminal equipment designated by the user because the terminating terminal equipment is busy or when no response is made within a predetermined time (for example, when the calls from 12:00 to 13:00 are to be forwarded to "Mail Box" in the example shown in FIG. 9), it executes the functional element module 119.

Accordingly, the message [Request Report BCSM Event (T_Called_Party_Busy EDP/R, T_No_Answer EDP/R)] 150 for arming the trigger EDP/R to the DP 13 (T_Called_Party_Busy) 133 and to the DP 14 (T_No_Answer) 143 of the basic call processing routine 12 of the switching system, the call disconnection notification message [Request Report BCSM Event (T_Disconnect EDP/N)] 151 and the message [Connect] 152 for requesting connection setup designating the telephone number of the terminating terminal equipment, are sent from the SCP 1 to the switching system 3.

The switching system 3 sends these messages to the basic call processing routine 13.

The basic call processing routine 13 receives these messages by the DP 12 (Term._Attempt_Authorized) 104, arms the trigger EDP/R to the DP 13 (T_Called_Party_Busy) 133 and to the DP 14 (T_No_Answer) 143, and arms the trigger EDP/N to the DP 17 (T_Disconnect) 126.

Accordingly, if the terminating terminal equipment becomes busy while the switching system is executing the basic call processing, the procedures after the step 134 of the Case 2 (FIG. 13) are similarly carried out, and when the terminating terminal equipment does not answer for a predetermined time, the procedures after the step 144 of the Case 3 (FIG. 14) are similarly carried out.

The foregoing embodiment explains the case where the service contents which are different depending on the time zones are defined to the SDF server as shown typically in FIG. 9. However, as the control information for terminating services, the present invention can be modified in various ways such as service designation in accordance with the days of the week, the combination of this service with a service in accordance with the time band, the combination of these services with an automatic service function provided to the terminating terminal equipment, and so forth.

Since the control information for the terminating service which has been registered already can be appropriately changed and omitted by the operation from the SMP, the present invention can flexibly cope with the user's requirements.

It is to be understood that the embodiments given above are merely illustrative of the principle of the invention and that many variations may be devised by those skilled in the art without departing from the spirit and the scope of the invention. It is therefore intended that such variations be included within the scope of the claims.

What is claimed is:

1. A telecommunications service control method in a telecommunications network having at least one switching system and a service control apparatus connected to said one switching system and equipped with a memory device for storing service control information for each user, said method comprising:

a step of creating a call control sequence for controlling a state of a call inside said one switching system when said one switching system accepts said call relating to a special telecommunications service to be provided by said service control apparatus, whereby a first trigger for requesting transmission of a control signal to said service control apparatus is armed to a predetermined detection point in said call control sequence;

a step of controlling said call in accordance with said call control sequence by said one switching system and sending a first control signal from said one switching system to said service control apparatus when the state of said call shifts to said predetermined detection point in said call control sequence, said first control signal specifying a terminating user of said call;

a step of reading out the service control information corresponding to said terminating user specified by said first control signal from said memory device in said service control apparatus;

a step of notifying a detection point so that said service control apparatus arms a next trigger in said call control sequence to said one switching system in accordance with the content of said service control information read out from said memory device; and a step of causing said one switching system to arm a second trigger to a detection point designated by said service control apparatus in said call control sequence.

2. A telecommunications service control method according to claim 1, wherein said service control apparatus notifies a plurality of detection points for arming the trigger, to said switching system in response to said first control signal.

3. A telecommunications service control method in a telecommunications network having at least one switching system and a service control apparatus connected to said switching system and equipped with a memory device for storing service control information for each user, said method comprising:

a step of creating a call control sequence for controlling a state of a call inside said switching system when said switching system accepts said call relating to a special telecommunications service to be provided by said service control apparatus, whereby a first trigger for requesting transmission of a control signal to said service control apparatus is armed to a predetermined detection point in said control sequence;

a step of controlling said call in accordance with said call control sequence by said switching system and sending a first control signal from said switching system to said service control apparatus when the state of said call shifts to said predetermined detection point in said call control sequence;

a step of notifying a detection point so that said service control apparatus receiving said first control signal arms a next trigger in said call control sequence to said switching system in accordance with the content of the service control information read out from said memory device and corresponding to a terminating user of said call;

a step of causing said switching system to arm a second trigger to a detection point designated by said service control apparatus in said call control sequence;

a step of sending a second control signal from said switching system to said service control apparatus when the state of said call shifts to a detection point to which said second trigger in said call control sequence is armed;

a step of causing said service control apparatus to designate the content of a special service determined in accordance with said service control information to said switching system in response to said second control signal; and a step of causing said switching system to execute said special service designated by said service control apparatus in association with said call.

4. A telecommunications service control method according to claim 3, wherein said service control apparatus notifies a plurality of detection points for arming the trigger, to said switching system in response to said first control signal.

5. A telecommunications service control method according to claim 4, wherein said service control apparatus designates, as said special service, a call forwarding terminating apparatus determined in accordance with the time zone in which said first control signal is received and with the state of a terminating equipment, to said switching system, and said switching system terminates said call at said call forwarding terminating apparatus.

6. A telecommunications service control method according to claim 3, wherein said service control apparatus designates a special service determined by a detection point as the cause of creation of said second control signal, to said switching system.

7. A telecommunications service control method according to claim 3, wherein said service control apparatus designates a call forwarding terminating apparatus of said call to said switching system as said special service, and said switching system terminates said call at said call forwarding terminating apparatus.

8. A telecommunications service control method according to claim 3, wherein said service control apparatus designates, as said special service, a call forwarding terminating apparatus determined in accordance with the state of a terminating equipment to said switching system, and said switching system terminates said call at said call forwarding terminating apparatus.

9. A telecommunications service control method in a telecommunications network having at least one switching system and a service control apparatus connected to said switching system and equipped with a memory device for storing service control information for each user, said method comprising:

a step of creating a call control sequence for controlling a state of a call inside said switching system when said switching system accepts said call relating to a special telecommunications service to be provided by said service control apparatus, whereby a first trigger for requesting transmission of a control signal to said service control apparatus is armed to a predetermined detection point in said control sequence;

a step of controlling said call in accordance with said call control sequence by said switching system and sending a first control signal from said switching system to said service control apparatus when the state of said call shifts to said predetermined detection point in said call control sequence;

a step of notifying a detection point so that said service control apparatus receiving said first control signal arms a next trigger in said call control sequence to said switching system in accordance with the content of the service control information read out from said memory device and corresponding to a terminating user of said call;

a step of causing said switching system to arm a second trigger to a detection point designated by said service control apparatus in said call control sequence;

wherein said service control apparatus stores, as said service control information, those service contents which are different depending on time zones in said memory device thereof, and designates a special service corresponding to said time zone in which said first control signal is received, to said switching system.

10. A telecommunications service control method in a telecommunications network having at least one switching system and a service control apparatus connected to said one switching system and equipped with a memory device for storing service control information for each user, said method comprising:

a step of creating a call control sequence for controlling a state of a call inside said one switching system when said one switching system accepts said call relating to a special telecommunications service to be provided by said service control apparatus, whereby a first trigger for requesting transmission of a control signal to said service control apparatus is armed to a predetermined detection point in said call control sequence;

a step of controlling said call in accordance with said call control sequence by said one switching system and sending a first control signal including a dial number from said one switching system to said service control apparatus when the state of said call shifts to said predetermined detection point in said call control sequence;

a step of causing said service control apparatus receiving said first control signal to execute a service program so arranged in advance as to correspond to said dial number, and to read out the service control information corresponding to said dial number from said memory device during the execution process of said service program;

a step of causing said service control apparatus to notify a detection point for arming a next trigger in said call control sequence to said one switching system in accordance with the content of said service control information read out from said memory device; and a step of causing said one switching system to arm a second trigger to a detection point designated by said service control apparatus in said call control sequence.

11. A telecommunications service control method according to claim 10, wherein said service control apparatus notifies a plurality of detection points for arming the trigger to said switching system in response to said first control signal.

12. A telecommunications service control method in a telecommunications network having at least one switching system and a service control apparatus connected to said switching system and equipped with a memory device for storing service control information for each user, said method comprising:

a step of creating a call control sequence for controlling a state of a call inside said switching system when said switching system accepts said call relating to a special telecommunications service to be provided by said service control apparatus, whereby a first trigger for requesting transmission of a control signal to said service control apparatus is armed to a predetermined detection point in said control sequence;

a step of controlling said call in accordance with said call control sequence by said switching system and sending a first control signal including a dial number from said switching system to said service control apparatus when the state of said call shifts to said predetermined detection point in said call control sequence;

a step of causing said service control apparatus receiving said first control signal to execute a service program so arranged in advance as to correspond to said dial number, to read out service control information correspond to said dial number from said memory device during the execution process of said service program, and to notify a detection point for arming next the trigger in said call control sequence to said switching system;

a step of causing said switching system to arm a second trigger to a detection point designated by said service control apparatus in said call control sequence;

a step of sending a second control signal from said switching system to said service control apparatus when the state of said call shifts to a detection point at which said second trigger in said call control sequence is armed;

a step of causing said service control apparatus to designate the content of a special service determined by said service control information to said switching system in response to said second control signal; and a step of causing said switching system to execute said special service designated from said service control apparatus in association with said call.

13. A telecommunications service control method according to claim 12, wherein said service control apparatus designates a full forwarding terminating apparatus of said call to said switching system as said special service, and said switching system terminates said call at said call forwarding terminating system.

14. A telecommunications service control according to claim 12, wherein said service control apparatus designates a call forwarding terminating apparatus determined in accordance with the state of a terminating equipment to said switching system as said special service, and said switching system terminates said call at said call forwarding terminating apparatus.

15. A telecommunications service control method according to claim 12, wherein said service control apparatus notifies a plurality of detection points for arming the trigger to said switching system in response to said first control signal.

16. A telecommunications service control method in a telecommunications network having at least one switching system and a service control apparatus connected to said switching system and equipped with a memory device for storing service control information for each user, said method comprising:

a step of creating a call control sequence for controlling a state of a call inside said switching system when said switching system accepts said call relating to a special telecommunications service to be provided by said service control a appartus whereby a first trigger for requesting transmission of a control siqnal to said service control apparatus is armed to a predetermined detection point in said control sequence;

a step of controlling said call in accordance with said call control sequence by said switching system and sending a first control signal including a dial number from said switching system to said service control apparatus when the state of said call shifts to said predetermined detection point in said call control sequence;

a step of causing said service control apparatus receiving said first control signal to execute a service program so arranged in advance as to correspond to said dial number, to read out service control information correspond to said dial number from said memory device during the execution process of said service program, to notify a detection point for arming next the trigger in said call control sequence to said switching system; and a step of causing said switching system to arm a second trigger to a detection point designated by said service control apparatus in said call control sequence;

wherein said service control apparatus stores, as said service control information, those service contents which differ depending on time zones, in said memory device thereof, and designates a special service corresponding to the time zone in which said first control signal is received, to said switching system.

17. A telecommunications service control method in a telecommunications network having at least one switching system and a service control apparatus connected to said switching system and equipped with a memory device for storing service control information for each user, said method comprising:

a step of creating a call control sequence for controlling a state of a call inside said switching system when said switching system accepts said call relating to a special telecommunications service to be provided by said service control appartus, whereby a first trigger for requesting transmission of a control signal to said service control apparatus is armed to a predetermined detection point in said control sequence;

a step of controlling said call in accordance with said call control sequence by said switching system and sending a first control signal including a dial number from said switching system to said service control apparatus when the state of said call shifts to said predetermined detection point in said call control sequence;

a step of causing said service control apparatus receiving said first control signal to execute a service program so arranged in advance as to correspond to said dial number, to read out service control information correspond to said dial number from said memory device during the execution process of said service program, and to notify a detection point for arming next the trigger in said call control sequence to said switching system; and a step of causing said switching system to arm a second trigger to a detection point designated by said service control apparatus in said call control sequence;

wherein said service control apparatus designates a call forwarding terminating apparatus determined in accordance with a time zone in which said first control signal is received and with the state of terminating apparatus, to said switching system as said special service, and said switching system terminates said call at said call forwarding terminating apparatus.

18. A telecommunications service control method for a telecommunications network having at least one switching system and a service control point apparatus connected to said switching system, for providing the communications services, said method comprising:

a step of storing service definition information in a memory device of said service control point apparatus in such a manner as to correspond to each user;

a step of creating a basic call state model for arming a trigger to predetermined one of a plurality of detection points when a new call is received in said switching system;

a step of sending a first control signal from said switching system to said service control point apparatus when the state of said call shifts to said predetermined detection point of said basic call state model;

a step of causing said service control point apparatus receiving said first control signal to read out said service definition information corresponding to the terminating user of said call from said memory device and to send a second control information representing at least one detection point in said basic call state model and a trigger to be armed to said detection point to said switching system in accordance with the relation between the state of a called terminating equipment and a call forwarding terminating apparatus designated by said service definition information, to said switching system;

a step of causing said switching system to arm the trigger to said detection point designated by said second control information in said basic call state model;

a step of causing said switching system to shift the state in said basic call state model in accordance with the state of said called terminating equipment, and to send a third control signal to said service control point apparatus when said state shifts to said detection point to which said trigger is armed;

a step of causing said service control point apparatus to send a fourth control signal for designating another terminating equipment designated in advance by said service definition information to said switching system in response to said third control signal; and a step of causing said switching system to terminate said call to said terminating equipment designated by said fourth control signal.

19. A telecommunications service control method according to claim 18, wherein said service control point apparatus designates a detection point as a shift point when said called terminating equipment is busy, and the trigger to be armed to said detection point, by said second control signal, and designates a terminating equipment at which said call is to be terminated when said called terminating equipment is busy, by said fourth control signal.

20. A telecommunications service control method according to claim 18, wherein said service control point apparatus designates a detection point as a shift point when a called terminal equipment does not answer, and the trigger to be armed to said detection point, by said second control signal, and designates a terminal equipment to be terminated when said called terminal equipment does not answer, by said fourth control signal.

21. A telecommunications service control method according to claim 18, wherein said service control point apparatus designates detection points which are different depending on time zones and triggers to be armed to said detection points, by said second control signal, and designates terminal equipments which are different depending on the time zone by said fourth control signal.

22. A telecommunications network comprising at least one switching system connected to a plurality of user terminal equipment and a service control apparatus for providing personal telecommunications services, connected to said switching system, wherein said switching system includes:

means for executing call control while shifting a state in accordance with a call state model in such a manner as to correspond to each call; and means for sending, to said service control apparatus, a control signal including a dial number of a call when the state of said call shifts to any of detection points in said call state model and if, in this instance, a trigger for representing a transmission request of a control signal is armed to said detection point, wherein said service control apparatus includes:

first memory means for storing the relation of correspondence between said dial number and a service id;

second memory means for storing a plurality of records for service control which are so arranged as to correspond to said dial number, respectively;

third memory means for storing a plurality of service routines each having an intrinsic service id, and having the functions of reading out an information record for service control specified by said dial number from said second memory means and designating at least one detection point to which a trigger is to be armed in accordance with the content of said information record; and processor means for determining a service id corresponding to said dial number designated by said control signal by looking up said first memory means when the first control signal in one call is received from said switching system, executing said service routine corresponding to said service id read out from said third memory means and notifying control information representing at least one detection point and a kind of triggers to be armed to said detection point, to said switching system; and wherein said switching system consequently executes the service designated by said service control apparatus.

23. A telecommunications network comprising at least one switching system connected to a plurality of user terminal equipments and a service control apparatus for providing personal telecommunications services, connected to said switching system, wherein said switching system includes:

memory means for storing a call state model corresponding to each call; and means for arming a trigger representing a transmission request of a control signal to said service control apparatus at a predetermined detection point in said call state model, and sending said control signal including a dial number of a call to said service control apparatus when the state of said call shifts to said specific detection point to which said trigger is armed; wherein said service control apparatus includes:

first memory means for storing the relation of correspondence between said dial number and a service id;

second memory means for storing a plurality of information records for service control specified by said dial number and said service id, respectively;

third memory means for storing a plurality of service routines each having an intrinsic service id, and having the functions of reading out an information record for service control specified by said dial number and said service id from said second memory means and designating at least one detection point to which said trigger is to be armed in accordance with the content of said service control information; and processor means for determining a service id corresponding to said dial number designated by said control signal by looking up said first memory means when the first control signal in each call is received from said switching system, executing said service routine corresponding to said service id read out from said third memory means and notifying response signal representing at least one detection point and a kind of triggers to be armed to said detection point, to said switching system; and wherein said switching system consequently executes the service designated by said service control apparatus.

24. A telecommunications service control method in a telecommunications network having at least one switching system and a service control apparatus connected to said switching system and equipped with a memory device for storing service control information for each user, said method comprising:

a step of creating a call control sequence for controlling a state of a call inside said switching system when said switching system accepts said call relating to a special telecommunications service to be provided by said service control apparatus, whereby a first trigger for requesting transmission of a control signal to said service control apparatus is armed to a predetermined detection point in said control sequence;

a step of controlling said call in accordance with said call control sequence by said switching system and sending a first control signal from said switching system to said service control apparatus when the state of said call shifts to said predetermined detection point in said call control sequence;

a step of notifying a detection point so that said service control apparatus receiving said first control signal arms a next trigger in said call control sequence to said switching system in accordance with the content of the service control information read out from said memory device and corresponding to a terminating user of said call;

a step of causing said switching system to arm a second trigger to a detection point designated by said service control apparatus in said call control sequence;

wherein said service control apparatus designates, as a special service, a call forwarding terminating apparatus determined in accordance with the time zone in which said first control signal is received and with the state of a terminating equipment, to said switching system, and said switching system terminates said call at said call forwarding terminating apparatus.

* * * * *